(12) United States Patent
Browne et al.

(10) Patent No.: US 9,588,020 B2
(45) Date of Patent: Mar. 7, 2017

(54) TEST METHOD

(71) Applicant: GM Global Technology Operations LLC, Detroit, MI (US)

(72) Inventors: Alan L. Browne, Grosse Pointe, MI (US); Xiujie Gao, Troy, MI (US); Nancy L. Johnson, Northville, MI (US); Christopher B. Churchill, Ann Arbor, MI (US); Guillermo A. Herrera, Winnetka, CA (US); Geoffrey P. McKnight, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 511 days.

(21) Appl. No.: 14/271,118

(22) Filed: May 6, 2014

(65) Prior Publication Data
US 2015/0323424 A1 Nov. 12, 2015

(51) Int. Cl.
*F03G 7/06* (2006.01)
*G01M 99/00* (2011.01)

(52) U.S. Cl.
CPC ............ *G01M 99/007* (2013.01); *F03G 7/06* (2013.01); *F03G 7/065* (2013.01); *G01M 99/008* (2013.01); *G03B 2205/0076* (2013.01)

(58) Field of Classification Search
CPC .... G03B 2205/0076; F03G 7/06; F03G 7/065
USPC ................................. 73/760, 865.9; 374/187
See application file for complete search history.

(56) References Cited

U.S. PATENT DOCUMENTS

| | | | |
|---|---|---|---|
| 7,111,210 B2 | 9/2006 | Nagahashi et al. | |
| 8,881,521 B2* | 11/2014 | Browne | D07B 1/0673 57/237 |
| 2012/0223727 A1* | 9/2012 | Gao | F03G 7/065 324/691 |
| 2014/0060036 A1* | 3/2014 | Gao | F01P 7/10 60/527 |
| 2014/0077940 A1 | 3/2014 | Browne et al. | |

* cited by examiner

*Primary Examiner* — David A Rogers
*Assistant Examiner* — Gedeon M Kidanu
(74) *Attorney, Agent, or Firm* — Dierker & Kavanaugh, P.C.

(57) ABSTRACT

A method of testing a shape memory alloy (SMA) actuated device includes cyclically operating the device. The method further includes determining a number of cycles in a functional life of the device based on observations of the device during the cyclical operation. The functional life is a range of consecutive cycles of operation of the device beginning with a first cycle during which the device performs within a specified limit. The functional life is immediately followed by a cycle during which the device performs outside of the specified limit. The method still further includes applying a progressive substitution sub-process to identify an opportunity to increase the number of cycles in the functional life of the device.

20 Claims, 7 Drawing Sheets

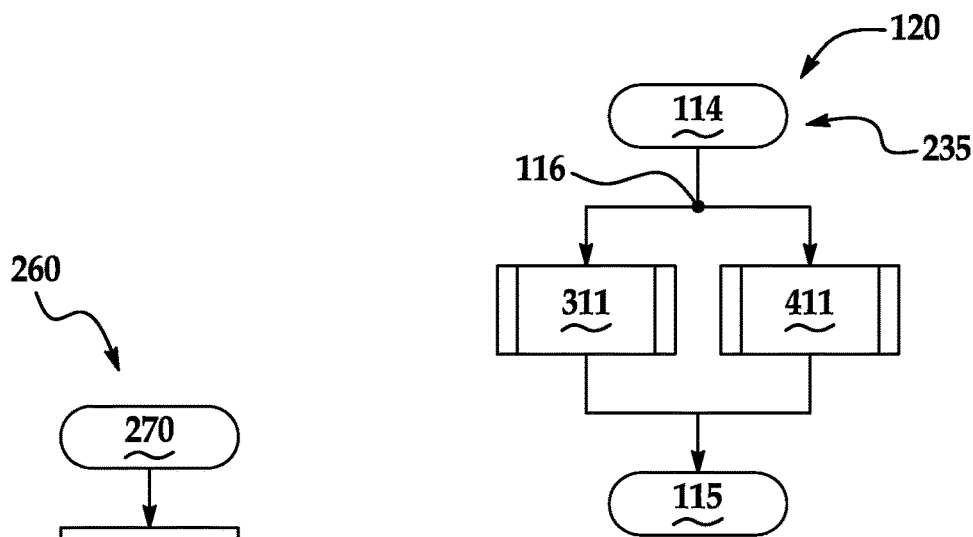
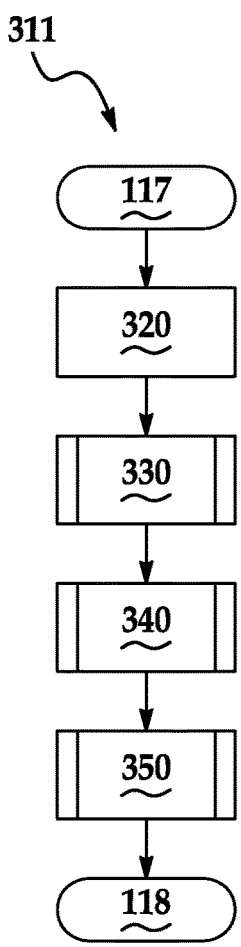
FIG. 2B
FIG. 2C
FIG. 2D

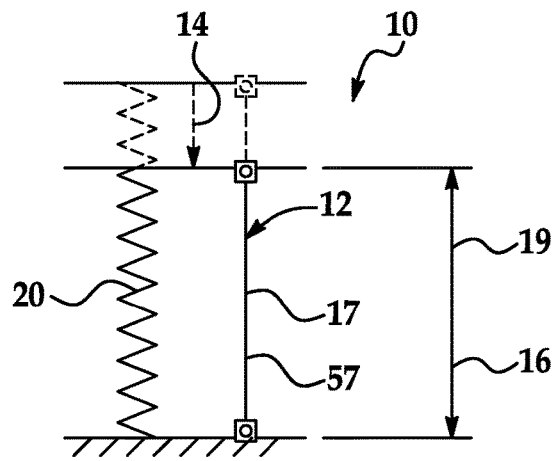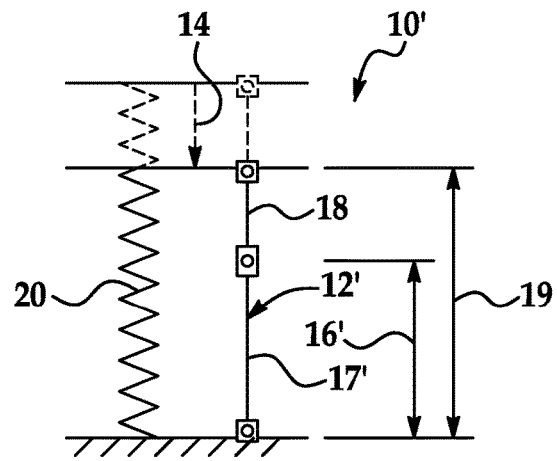
FIG. 3A  FIG. 3B
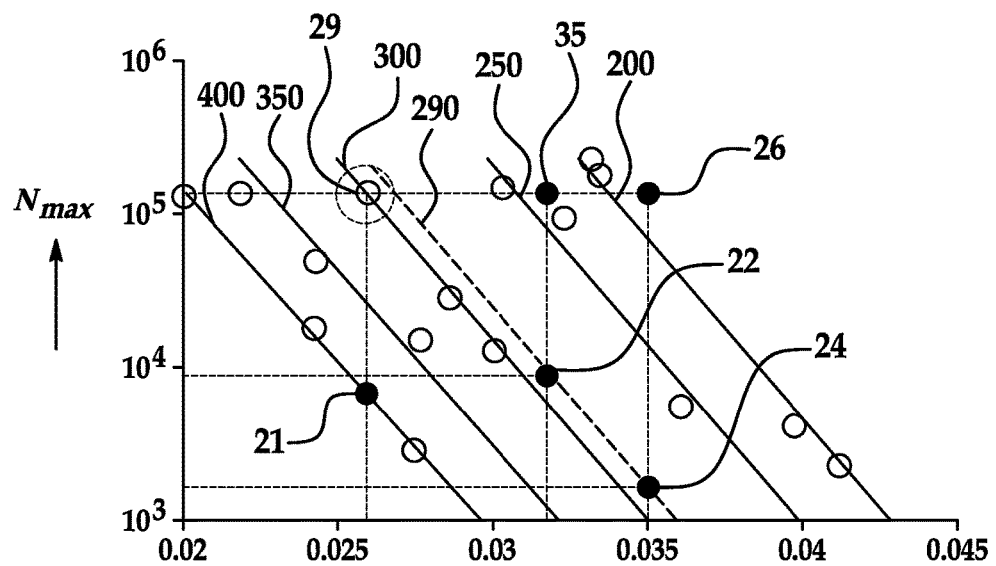
FIG. 4

TEST METHOD

TECHNICAL FIELD

The present disclosure relates generally to accelerated testing of devices having Shape Memory Alloy actuators.

BACKGROUND

Some devices that are mass produced are designed to meet specifications for design life. For example, components of a machine may be designed to operate for at least a particular number of cycles. Such an operational design life may be relatively long compared to the time available for testing and development before commencement of production of the component is planned. For example, it may take several years to operate a component for specified number of cycles. As such, if design development requires two or three design iterations, test and development could take, for example, a decade using conventional testing. Accelerated test methods are used to reduce the amount of time that it takes to test durability and reliability of devices.

SUMMARY

A method of testing a shape memory alloy (SMA) actuated device includes cyclically operating the device. The method further includes determining a number of cycles in a functional life of the device based on observations of the device during the cyclical operation. The functional life is a range of consecutive cycles of operation of the device beginning with a first cycle during which the device performs within a specified limit. The functional life is immediately followed by a cycle during which the device performs outside of the specified limit. The method still further includes applying a progressive substitution sub-process to identify an opportunity to increase the number of cycles in the functional life of the device.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is flow chart depicting steps in an example of the present disclosure;

FIGS. 2A-2H are flow charts depicting steps in an example of the present disclosure;

FIG. 3A is a semi-schematic diagram depicting a device according to an example of the present disclosure;

FIG. 3B is a semi-schematic diagram depicting a modified device according to an example of the present disclosure;

FIG. 4 is an example of a chart depicting a predetermined relationship between strain and actuation cycles at various stress levels for an SMA material;

DETAILED DESCRIPTION

Figures 1, 2A:
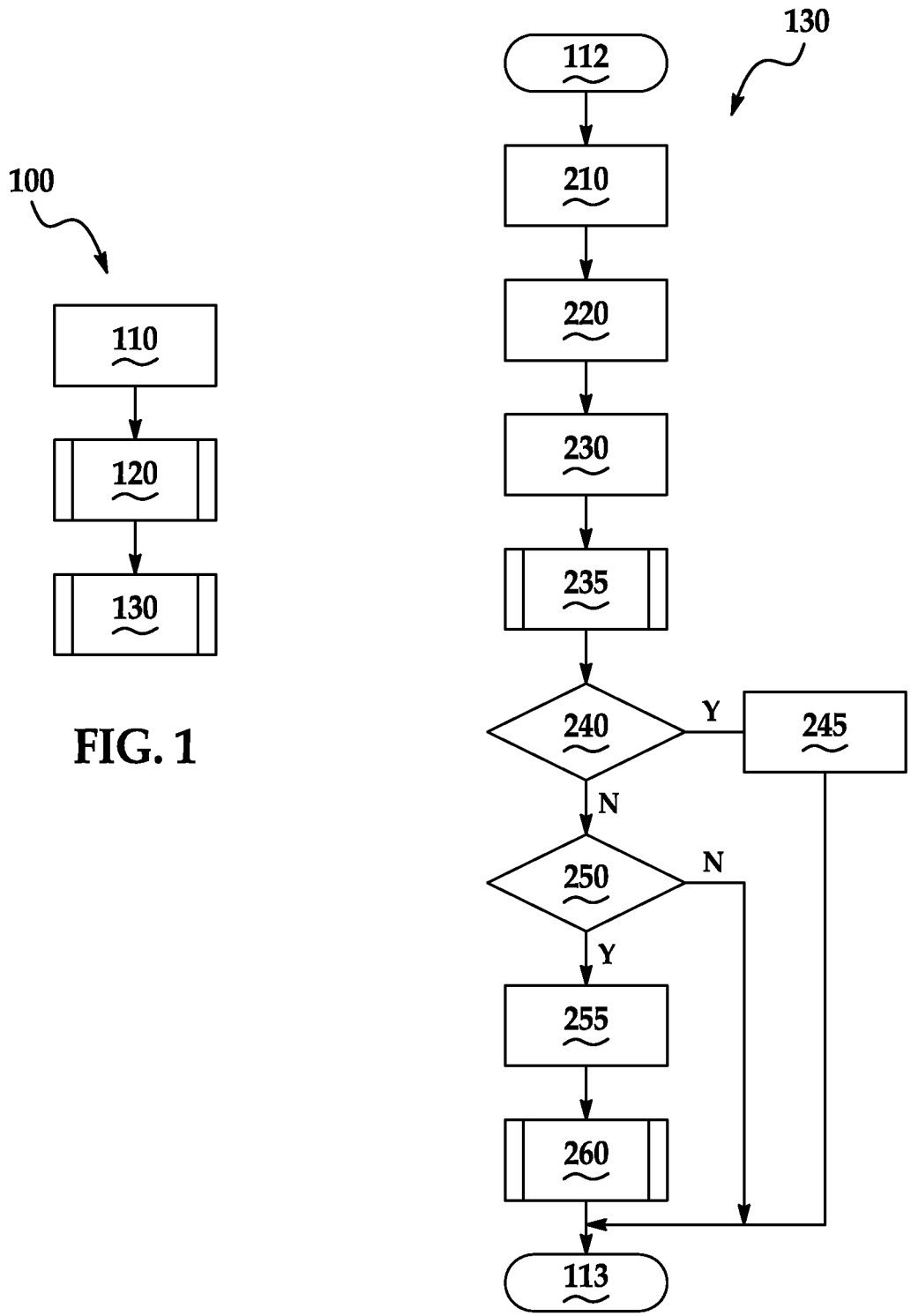

Shape memory alloys (SMAs) may have two phases: a lower modulus, lower temperature, crystalline martensite phase; and a higher modulus, higher temperature, austenite phase of a different crystal structure. The transition from one phase to the other may, by appropriate choice of alloy system, alloy composition, heat treatment or applied stress, be selected to occur over a temperature span of from about −100° C. up to about +150° C. Some SMA alloys exist in their martensite form at, or slightly above, about 25° C., and transform to their austenite form at temperatures ranging from about 60° C. to about 80° C. With such characteristics, an SMA implemented in a motor vehicle will be in its martensitic phase at essentially any expected ambient temperature, and the SMA will transform to austenite with only modest heating.

SMAs may be used as mechanical actuators. Some alloys for actuator applications are prepared as linear members. These members may be wires, but other suitable shapes include tapes, chains or cables. For brevity only, and without limitation, the term wire may be used in this disclosure where other suitable shapes may be used. SMA wires, after shaping to a desired 'remembered' length or shape in their austenite phase, are cooled to ambient temperature. On cooling, the SMA wires will revert to their martensite crystal structure. The wires may then be stretched and deformed to some predetermined length. The deformation exceeds the maximum allowable elastic strain which may be imposed on the actuator and is often termed pseudo-plastic deformation. These pseudo-plastically-deformed martensitic wires are in the appropriate starting condition for an actuator.

Generally the stretch or strain, that is, the change in length of the wire divided by its original or base length, applied during such pseudo-plastic deformation does not exceed 7%, and more commonly may be 4% or less. The base length, to which all length changes are referred, is the length of the wire in its high temperature, austenite phase.

Deformed martensitic shape memory alloys may, when heated and transformed to austenite, revert to their original undeformed shape and are capable of exerting appreciable force as they do so. In changing shape, the wire will shorten by an amount substantially equal to the pseudo-plastic strain previously applied when it was in its martensitic form. As such, by suitable choice of wire length, any desired displacement may be achieved. For example, a 100 mm length of wire, prestrained to 3% strain, may enable a displacement of about 3 mm.

SMAs are able to apply a significant force as the SMA changes length, thereby making SMAs suitable for use as actuators in mechanical devices. In an example, a pseudo-plastically stretched martensite SMA wire of a length suitable for an intended displacement is heated along its entire length and transformed to austenite. The transformation to austenite causes the wire to contract so that it may linearly displace an attached moving element.

In an example, the attached moving element may be an airflow management device which may be deployed on-demand by action of the SMA actuator. Other linear motion devices such as latches may also be operated by SMA actuators. Also, by addition of pulleys and similar mechanical contrivances, an SMA actuator may be adapted to enable rotary motion. Any heat source may be used to elevate the SMA wire temperature and promote its transition to austenite. As disclosed herein, if the SMA wire is heated uniformly along its length and throughout its cross-section so that substantially the entire volume may be heated and transformed, the transformation will occur simultaneously throughout the wire volume.

In examples of the present disclosure, electrical resistance heating produces uniform heating of an SMA wire. Electrical connections may be made to the SMA wire ends for attachment to a suitable power source, e.g. a vehicle power bus, and a controlled current passed along the length of the SMA wire.

Actuator action may be reversed by stopping passage of the electric heating current and allowing the wire to cool to about ambient temperature and revert to its martensitic crystal structure. Forced cooling may not be necessary. During cooling, the SMA wire may not spontaneously change its length to its initial deformed length but, in its martensitic phase, it may be readily stretched again to its initial predetermined length. Any suitable approach, including deadweights, may be employed to stretch the wire. In an example, a spring positioned in series or parallel with the SMA wire may be used. Stretching may be continued until the wire ends are positioned against preset stops which establish the predetermined wire length.

These changes in length result from the transition in crystal structure resulting from the imposed temperature changes. Provided the transition in crystal structure is fully reversible, this cycle of extending and contracting the wire by application of suitable thermal stimulus may continue indefinitely. However, the phase transitions and the accompanying cyclic transitions from extended length to retracted length and back again to extended length, may not be completely reversible. This irreversibility may lead to changes in the operating characteristics of the SMA wire with continuing use and even to fatigue of the SMA wire after extensive use.

Figure 6A:
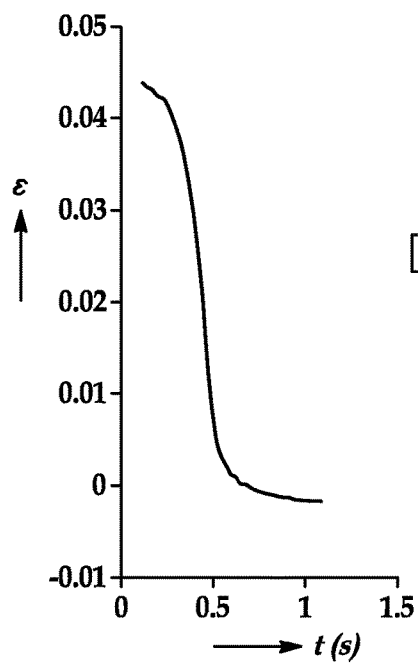
FIG. 6A is an example of a graph of strain experienced in an SMA actuator over time during a microstructure transformation according to the present disclosure.
Figure 6B:
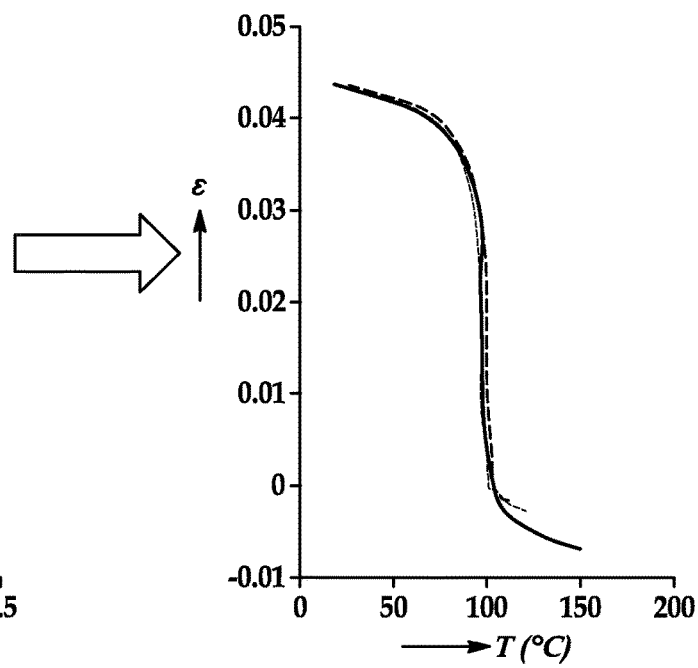
FIG. 6B is an example of a graph of strain versus temperature for the same microstructure transformation depicted in FIG. 6A.

A transformation of an SMA specimen from martensite to austenite is depicted in FIGS. 6A and 6B. While the numerical values are specific to the tested wire, the form of these curves is generally reflective of the transformation of any SMA element from martensite to austenite. The initial temperature of the SMA is less than its transformation temperature so the wire is initially in its martensite phase.

An example of an SMA actuator according to the present disclosure may be designed conservatively so that the intended displacement is initially obtained without fully transforming the SMA.

After some cycling, cycle-to-cycle irreversibility will begin to permanently change the SMA element. Typically the SMA element will accumulate some plastic strain, manifested as a permanent extension of the wire, which will lead to a reduction in the available stroke. In a fixed displacement device, this will require that the element contract to a greater extent to compensate for the permanent extension. This will require additional heating so that the SMA may achieve a more elevated temperature to promote additional transformation of martensite to austenite.

When a device is a system of components, each component is designed based on the function of the component and the environment in which the component operates. For example, an SMA actuator may be designed to open and close a valve for a certain design life. The design may account for factors such as mechanical load and expected variation in the amount of stroke required to open and close the valve. Durability and reliability tests may be performed on the system prior to releasing the system for use as a product. Even though the components may have been originally designed taking into account the known factors that affect achieving the design life, unknown factors and unexpected variation may result in the system being unable to perform within specification for the design life. In such a circumstance, iterations of design and testing may be performed to achieve a design that performs within specification for the design life.

In some cases, conventional testing of a system for the design life may take a large number of cycles over a long period of time. For example, if an operational cycle takes 10 seconds to perform, and the design life is 5 million cycles, then it would take 50 million seconds or about 579 days of continuous cycling to reach the design life. If the design life is not achieved, a revised design would be tested for another 579 days. With conventional testing, the reason that the system does not achieve the design life may not be revealed, leading to additional, time-consuming, measurement, testing and analysis. Accelerated testing is testing that predicts how a device would perform in conventional testing but without taking as much time as the conventional testing.

The inventors of the present disclosure have discovered a method of accelerated testing of an SMA actuated system that also identifies opportunities to increase the number of cycles in the functional life of the device. For example, suppose an original design operates within specified limits for only one half of the design life. Suppose undiscovered variation in the parts of the system require the actuator to stroke a greater distance than was originally predicted in design analysis, and this additional stroke causes the actuator to experience fatigue that shortens the operational life of the original design. By applying the method of the present disclosure, the actual stroke may be quickly identified in a fraction of the time it would have taken to perform conventional durability testing.

In an example of the present disclosure, a method 100 of testing an SMA actuated device is depicted in the flow chart shown in FIG. 1. At 110, FIG. 1 depicts cyclically operating the device. As depicted at 120, the method further includes determining a number of cycles in a functional life of the device based on observations of the device during the cyclical operation. As used herein, the functional life means a range of consecutive cycles of operation of the device beginning with a first cycle during which the device performs within a specified limit. The functional life is immediately followed by a cycle during which the device performs outside of the specified limit. For example, if the device is a valve that is opened and closed according to a specification by an SMA actuator, the functional life would be the number of consecutive cycles of opening and closing within specification. The functional life is bounded by the first attempted cycle that does not meet the specification. It is to be understood that determining the number of cycles in the functional life does not require actually operating the device for the full number of cycles in the functional life. The method of the present disclosure includes cyclical operation of actual device hardware, and is therefore, not entirely a computer simulation or virtual test.

As shown at step 130, the method 100 of testing further includes applying a progressive substitution sub-process to identify an opportunity to increase the number of cycles in the functional life of the device. The progressive substitution sub-process 130 detailed below actually decreases the functional life of the test specimens; however, the progressive substitution sub-process 130 identifies opportunities to change the design of the actuator that will, when the changes are implemented, increase the functional life of the device. The disclosed method is in sharp contrast to conventional design and test iteration, which would, for example, attempt to increase the functional life of each design iteration to be tested. In other words, if a part does not last long enough, conventional design and test iteration would replace the part with a stronger part and test to determine if the stronger part lasts longer. Because of the time and resources required to perform conventional testing, some products may be "over-designed" to increase a likelihood that the product will meet the specifications for the design life. However, over-designed products may result in a significant waste of resources, particularly if the product is mass produced.

FIG. 2A is a flowchart depicting an example of the progressive substitution sub-process referred to in step 130 above. Reference numerals 112 and 113 are flow chart conventions for the start and return, respectively. The progressive substitution sub-process 130 includes the step 210 of modifying the device 10 by substituting a modified SMA actuator 12' for the unmodified SMA actuator 12 to operate the modified device 10'. (FIGS. 3A and 3B depict the device 10 and modified device 10'.) In examples of the present disclosure, the modified SMA actuator 12' has a displacement 14 from an unactuated state (shown in hidden line) to a fully actuated state (shown in solid line in FIGS. 3A and 3B). The modified SMA actuator 12' has a reduced length 16' of SMA material 17' relative to an original length 16 of SMA material 17 in the unmodified SMA actuator 12 to cause a strain acceleration factor compared to the unmodified SMA actuator 12 operating in the device 10. In the example shown in FIG. 3B, a length of steel wire 18 has been combined with the reduced length 16' of the SMA material 17' to make the total length 19 of the actuator equal in the device 10 and the modified device 10'. The length of steel wire 18 is relatively constant compared to the reduced length 16' of the SMA material 17' since the steel does not undergo the microstructure transformation experienced by the SMA material. As such, the reduced length 16' of SMA material 17' will experience more strain (compared to the SMA material 17 in the device 10) to achieve the displacement 14.

Referring back to the example depicted in FIG. 2A, the progressive substitution sub-process 130 further includes the step 220 of determining a predicted life by predicting a number of cycles to cause the modified device 10' to perform outside of the specified limit based on the number of cycles in the functional life of the device 10 and based on a predetermined relationship between strain and actuation cycles for the SMA material.

For example, referring to the device 10 and modified device 10' of FIGS. 3A and 3B, the stress in the SMA material 17, 17' is estimated by dividing the force of the biasing spring 20 by the cross-sectional area of the SMA material 17, 17'. For the purpose of illustration, let the spring force be 228 N (Newtons), and let the SMA material 17, 17' be a round wire with a diameter of 1 mm (millimeter). In the illustration, the cross-sectional area of the SMA material would be about $7.85 \times 10^{-7}$ m$^2$ (square meters), and the stress would be about 290 MPa (megapascals). FIG. 4 is an example of a chart depicting a predetermined relationship between strain and actuation cycles at various stress levels for an SMA material. In FIG. 4, strain is shown on the abscissa (horizontal axis), and the ordinate (vertical axis) is the maximum number of actuation cycles (Nmax) depicted on a logarithmic scale. Now referring to FIG. 4, data point 22 is depicted at about 9000 cycles on the dashed iso-stress line at about 290 MPa. The iso-stress line at 290 MPa is dashed to indicate that it is interpolated between the empirically derived iso-stress lines for the SMA material 17, 17'. The strain corresponding to data point 22 is about 0.032. If the original length 16 of SMA material 17 is reduced by 10 percent to result in the reduced length 16' of SMA material 17', then the strain will be increased by 10 percent. The strain will be about 0.032+0.0032=0.035. Data point 24 corresponds to the iso-stress line at 290 MPa and the strain at 0.035. Thus, in the example of this paragraph, the predicted life for the modified device 10' is about 2000 cycles.

Referring back to the example depicted in FIG. 2A, the progressive substitution sub-process 130 further includes the step 230 of cyclically operating the modified device 10'. At step 235, FIG. 2A depicts a sub-process of determining a test life of the modified device 10'. As used herein, the test life means a range of consecutive cycles of operation of the modified device 10' beginning with a first cycle during which the modified device 10' will perform within a specified limit immediately followed by a cycle during which the modified device will perform outside of the specified limit. For example, the specified limit may be a complete actuation of the device (e.g. if the device is a valve, the valve may be fully opened or closed by the actuator). In the valve example, if the valve is not fully opened or closed in a cycle, then the modified device performs outside of the specified limit. It is to be understood that determining the test life does not require actually cycling the modified device 10' for the entire test life. Determining the test life may include acceleration techniques as disclosed herein. A plurality of samples, e.g., from 3 samples to 10 samples, may be tested to provide statistical confidence in the results.

Referring back to the example depicted in FIG. 2A, the progressive substitution sub-process 130 further includes the step 240 of comparing the predicted life to the test life. Recall that in the example used for illustration above, the predicted life was about 2000 cycles. In step 240, the predicted life is compared to the test life. If the predicted life is within a predetermined tolerance of the test life, at step 245, the sub-process 130 concludes that the opportunity to increase the number of cycles in the functional life of the device 10 is based on reducing a steady-state stress on the SMA actuator 12 in the device 10. In an example, the predicted life may be a statistical mean predicted life from a plurality of samples, and the predetermined tolerance may be about one standard deviation from the statistical mean predicted life. In other words, if the predicted life is within the predetermined tolerance of the test life, the behavior of the device 10 will be modeled by the empirically derived chart for the SMA material (e.g., FIG. 4). In the device depicted in FIG. 3A, the steady-state stress may be reduced by either increasing the diameter of the SMA material 17, or decreasing the spring force. In the example used for illustration, let the target life be 100,000 cycles. Point 26 corresponds to strain of 0.035 and 100,000 cycles. Extrapolating the empirical data predicts that the stress target is about 180 MPa in the illustration. In the example, the SMA material diameter could be increased to about 1.3 mm, or the spring force could be changed to about 141 N to achieve the stress target of 180 MPa.

Referring back to the example depicted in FIG. 2A, the progressive substitution sub-process 130 further includes the step 250 of comparing the functional life to the test life. Recall that in the example used for illustration above, the functional life was about 9000 cycles. If the test life is within a second predetermined tolerance of the functional life, at step 255, the sub-process 130 concludes that a component other than the SMA actuator causes a stroke incompatibility. In an example, the test life may be a statistical mean test life from a plurality of samples, and the second predetermined tolerance may be about one standard deviation from the statistical mean test life. In other words, if reducing the length of the SMA material does not result in a test life that is substantially different from the functional life, the behavior of the device will not be well modeled by the empirically derived chart for the SMA material (e.g., FIG. 4) using the design parameters as presently understood. For example, manufacturing variation in the device 10 may require a stroke that is larger than presently understood.

At step 260, the flowchart in FIG. 2A references a sub-process shown in FIG. 2B. Reference numerals 270 and 315 are flow chart conventions for the start and return respectively. As shown in FIG. 2B, in sub-process 260, the method of the present disclosure determines a solution for the stroke incompatibility. Sub-process 260 determines the solution for the stroke incompatibility by, at 280, substituting progressively shorter lengths of the SMA material 17 in a series of SMA actuators for cyclical operation in a series of the modified devices 10' until, at 290, determining a final length of SMA material 17 in a final SMA actuator that first causes a final device to perform outside of the specified limit on a first cycle. In other words, cyclical testing is used to find the longest SMA actuator that is just beyond the limit of strain such that it cannot even perform one cycle within specification. According to the present disclosure, the limit of strain for an SMA material is about 4.5 percent strain. Since the general equation for strain is the stroke divided by the length, the method of the present disclosure is able to determine the stroke. At step 300, the sub-process 260 continues by concluding that a stroke is 4.5 percent of the final length. At step 310, the sub-process 260 finishes by identifying the opportunity to increase the number of cycles in the functional life to a target life by determining a target stress based on the stroke and the original length of the SMA material based on the number of cycles in the target life of the device and based on a predetermined relationship between stress, strain and actuation cycles for the SMA material.

To illustrate by example, let the stroke be 3 mm. Let the original length of the SMA material be 93.5 mm. The original strain in the example is, therefore, 0.032. Let the target life be 100,000 cycles. Data point 38 is at 0.032 strain and 100,000 cycles in FIG. 4. Interpolating the iso-stress lines at the 100,000 cycle level provides a target stress of about 230 MPa. Recalling that the spring force in the original example was 228 N, the target stress (e.g., 230 MPa) will be realized with an SMA material cross-sectional area of about 228 N/230 MPa=$9.9 \times 10^{-7}$ m$^2$. The diameter of the SMA wire is $2*[(9.9 \times 10^{-7}/\pi)^{\wedge}0.5]=0.00112$ m=1.12 mm. As such, in the illustration, there is an opportunity to increase the number of cycles in the functional life of the device from 9000 cycles to 100,000 cycles by changing the diameter of the SMA material from 1.0 mm to 1.12 mm.

In examples of the present disclosure, determining the functional life (step 120) or determining the test life (step 235) may include accelerated testing based on i) a rate of rise of a maximum temperature of the SMA material in the device or the modified device, ii) applying an acceleration stress to the device or the modified device, or iii) a combination of i) and ii). FIG. 2C depicts that both step 120 and step 235 may apply the same sub-process. In FIG. 2C, reference numerals 114 and 115 are flow chart conventions for the start and return respectively. In FIG. 2C, the junction at 116 is an "inclusive or" junction. In other words, the process flow may include 311 or 411, or both 311 and 411 (consistent with the first sentence of this paragraph).

Figure 2E:
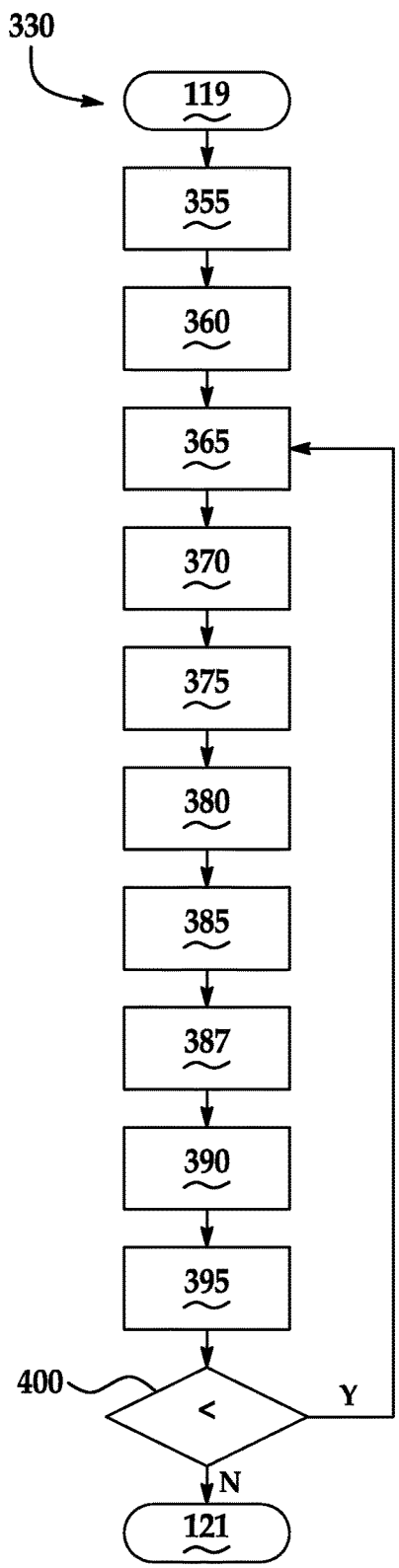

The accelerated testing based on the rate of rise of the maximum temperature of the SMA material in the device or the modified device is depicted as a sub-process at 311 depicted in FIG. 2D. In FIG. 2D, reference numerals 117 and 118 are flow chart conventions for the start and return respectively. Accelerated testing based on applying an acceleration stress to the device or the modified device is depicted in FIG. 2E as a sub-process at 411 (further details are found below). The sub-process 311 includes, at reference numeral 320, attaching an SMA specimen 57 to the device 10 or the modified device 10'. In an example, the SMA specimen 57 may be an SMA wire, ribbon, spring, sheet, coil, or any suitable shape for actuating the device 10 or the modified device 10'. The SMA specimen 57 depicted in FIG. 3A is an SMA wire. Next, step 330 includes cyclically testing the SMA specimen 57 in the device 10 or the modified device 10' to actuate and deactivate the device 10 or the modified device 10' until the maximum temperature of the SMA specimen 57 reaches a test completion temperature.

Figure 7:
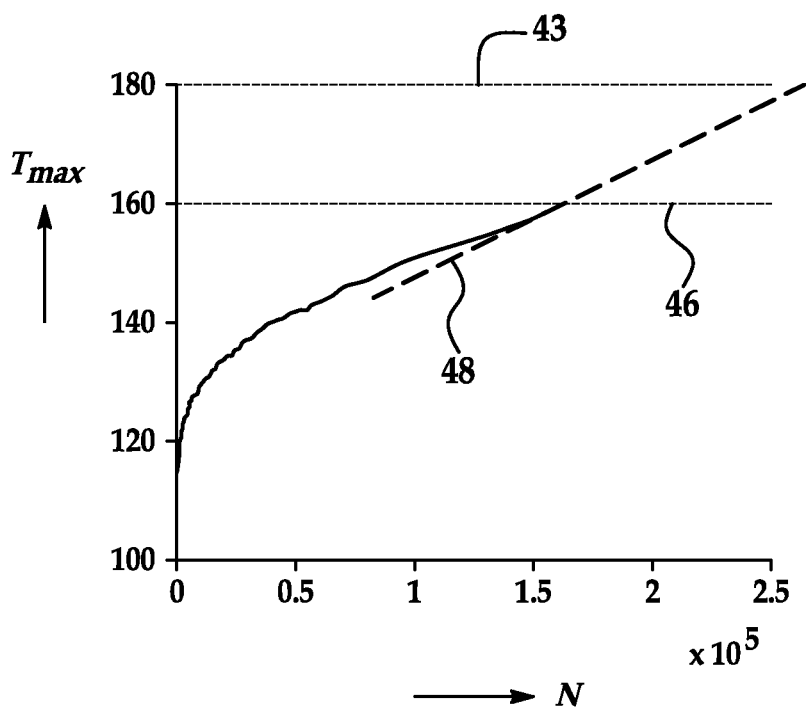
FIG. 7 depicts a graph of maximum temperature versus SMA transition cycle count for an example of an SMA material over a series of transition cycles according to the present disclosure.

FIG. 7 depicts a graph of maximum temperature versus SMA transition cycle count for an example of an SMA material over a series of transition cycles according to the present disclosure. In the example depicted in FIG. 7, the test completion temperature is shown at 46. At 340, the sub-process 311 includes determining a rate of rise of the maximum temperature of the SMA specimen corresponding to a number of transition cycles. At 350, the sub-process includes predicting an expected number of transition cycles in the test life of the SMA specimen based on the rate of rise of the maximum temperature of the SMA specimen. A total number of test cycles in step 330 is fewer than an actual number of transition cycles in the test life of the SMA specimen operating in the device or the modified device. In other words, the test is accelerated.

Figure 5:
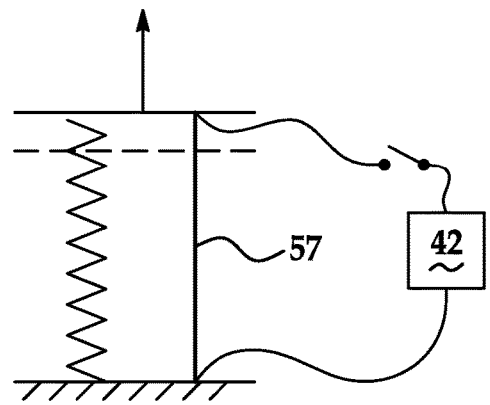
FIG. 5 is a semi-schematic diagram depicting an SMA specimen connected to an electrical power source according to an example of the present disclosure.

FIG. 2E depicts an example of sub-process 330 of cyclically testing the SMA specimen in the device 10 or modified device 10' to actuate and deactuate the device 10 or modified device 10' until the maximum temperature of the SMA specimen reaches the test completion temperature 46. In FIG. 2E, reference numerals 119 and 121 are flow chart conventions for the start and return respectively. As depicted in FIG. 2E, the sub-process 330 may include step 355, initializing an SMA transition cycle count at zero. Next, beginning an SMA transition cycle with the SMA specimen in a first microstructure state is depicted at step 360. At 365 is the step of incrementing the SMA transition cycle count by 1. At 370 is the step of connecting the SMA specimen to an electrical power source 42 (see FIG. 5) to pass an electrical current through the SMA specimen 57 to heat the SMA specimen 57 via Joule heating to cause the SMA specimen to activate and experience a microstructure transformation to a second microstructure state. In an example, the first microstructure state may be a crystalline martensite phase, and the second microstructure state may be an austenite phase.

As depicted in FIG. 2E, the sub-process 330 continues at 375 with the step of sensing a strain of the SMA specimen during the microstructure transformation. For example, the strain may be sensed by recording a change in position of a portion of the SMA specimen 57. FIG. 6A depicts an example of a graph of strain experienced over time during such a microstructure transformation. At 380 is the step of determining a temperature of the SMA specimen 57 during the microstructure transformation. As disclosed herein, determining the temperature of the SMA specimen 57 may include sensing the temperature. Sensing the temperature may be accomplished, for example, via a thermocouple attached to the SMA specimen, or an infra-red camera. In another example, determining the temperature of the SMA specimen 57 may include calculating the temperature of the SMA specimen using a mathematical model based on the electrical energy applied over time.

At 385 is the step of recording the temperature of the SMA specimen 57 during the microstructure transformation. FIG. 6B depicts an example of a graph of strain versus temperature for the same microstructure transformation depicted in FIG. 6A. Step 387 is determining the maximum temperature of the SMA specimen for the SMA transition cycle. As used herein, the maximum temperature of the SMA specimen for the SMA transition cycle means the temperature at the maximum strain rate during the transition cycle. In examples of the present disclosure, determining the maximum temperature of the SMA specimen for the SMA transition cycle may include determining a temperature corresponding to a location on a strain versus time curve. In an example, the location on the strain versus time curve may correspond to a maximum rate of strain. For example, the maximum strain rate in FIG. 6A corresponds to a strain ($\epsilon$, Greek letter epsilon) of about 0.02. The temperature corresponding to 0.02 strain in FIG. 6B is about 100° C. As such, in the example corresponding to FIG. 6A, the maximum temperature of the SMA specimen for the SMA transition cycle is about 100° C.

Referring back to FIG. 2E, step 390 is recording the maximum temperature of the SMA specimen for the SMA transition cycle with the SMA transition cycle count. FIG. 7 depicts a graph of maximum temperature versus SMA transition cycle count for an example of the sub-process 330. Step 395 in the sub-process 330 is disconnecting the electrical power source 42 from the SMA specimen 57 to allow the SMA specimen 57 to cool and experience a reversal of the microstructure transformation to the first microstructure state. At 400, the maximum temperature is compared to the test completion temperature. If the maximum temperature is less than the test completion temperature, the sub-process 330 is repeated from step 365. If the maximum temperature is greater than or equal to the test completion temperature, then cyclical testing is stopped, and the sub-process 330 is concluded. The method 100 continues at step 340 of sub-process 311.

In an example, cyclically testing the SMA specimen in step 330 may be performed using a sub-process other than sub-process 330 disclosed above. For example, rather than using Joule heating, infrared or induction heating may be used to cause the microstructure transformation.

Figure 2F:
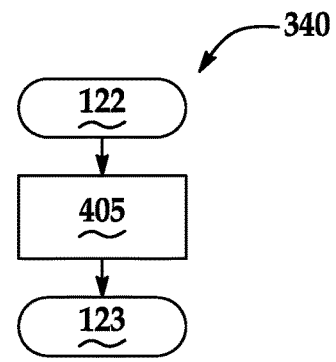

According to the present disclosure, step 340, determining a rate of rise of the maximum temperature of the SMA specimen corresponding to a number of transition cycles, may be a sub-process 340 as depicted in FIG. 2F. In an example, sub-process 340 may include step 405, extrapolating a maximum temperature versus SMA transition cycle count curve as depicted in FIG. 2F. In FIG. 2F, reference numerals 122 and 123 are flow chart conventions for the start and return, respectively. FIG. 7 depicts an example of an extrapolated maximum temperature versus SMA transition cycle count curve at 48. In examples of the present disclosure, extrapolating the maximum temperature versus SMA transition cycle count curve may include applying a linear regression technique to a sequence of data points including an ordered pair corresponding to the test completion temperature. Non-linear regression techniques are also contemplated herein. In the linear regression example, each data point consists of the maximum temperature and the SMA transition cycle count for a corresponding instance of SMA transition.

According to the present disclosure, the rate of rise of the maximum temperature of the SMA specimen may take a certain number of cycles to stabilize. In an example, the linear regression technique may be applied to a sequence of data points that excludes data points with the SMA transition cycle count ranging from 1 to a predetermined stabilization value. In an example, the predetermined stabilization value may range from about 20 cycles to about 100 cycles. In another example, the predetermined stabilization value may range from about 20,000 cycles to about 100,000 cycles.

According to the present disclosure, step 350, predicting an expected number of transition cycles in the test life of the SMA specimen based on the rate of rise of the maximum temperature of the SMA specimen, may further be a sub-process 350.

Figure 2G:
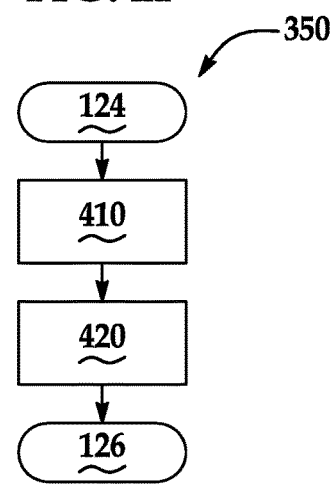

Referring now to FIG. 2G, reference numerals 124 and 126 are flow chart conventions for the start and return, respectively. As shown in FIG. 2G, sub-process 350 may include step 410. Step 410 is predicting a number of cycles that will correspond to a maximum operational temperature based on the extrapolating of the maximum temperature versus SMA transition cycle count curve. FIG. 7 depicts an example of a maximum operational temperature at 43. In the example shown in FIG. 7, the extrapolated maximum temperature 48 crosses the maximum operational temperature 43 at about $2.5 \times 10^5$ cycles, therefore the predicted number of cycles that will correspond to a maximum operational temperature is 250,000.

As depicted in FIG. 2G, sub-process 350 may continue with step 420. Step 420 is predicting an expected number of transition cycles in the test life of the SMA specimen in the device or modified device based on the predicted number of cycles that will correspond to the maximum operational temperature. In the example depicted in FIG. 7, the predicted number of cycles that will correspond to the maximum operational temperature is 250,000. Therefore, in the example depicted in FIG. 7, the expected number of transition cycles in the test life of the SMA specimen in the device or modified device is 250,000 cycles.

Figure 8:
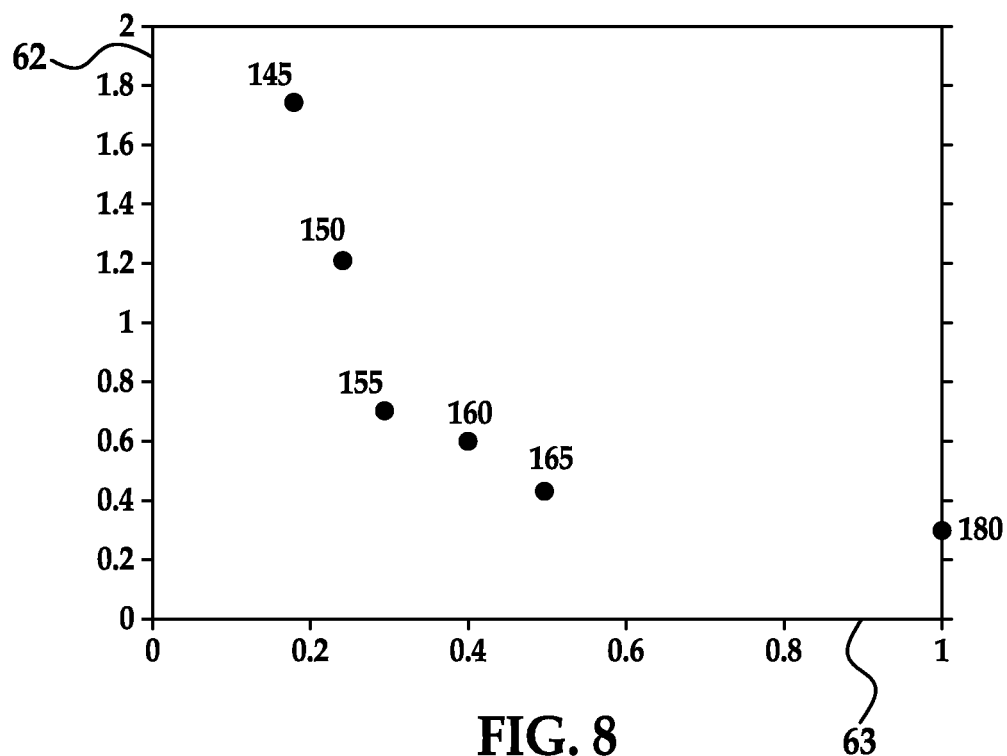
FIG. 8 is a graph depicting an experimentally determined relationship between test completion temperature, potential error in predicted test life, and test duration normalized over the test life according to an example of the present disclosure.

FIG. 8 shows an experimentally determined relationship between the test completion temperature, potential error in the predicted test life, and test duration normalized over the test life. Axis 62 is RMS (Root Mean Square) error, and axis 63 is normalized test duration. As shown in FIG. 8, a test completion temperature of 160° C. gives about a 50 percent reduction in the test duration with substantially no difference in the potential error compared to continuing cycling until the maximum operational temperature is reached.

Figure 2H:
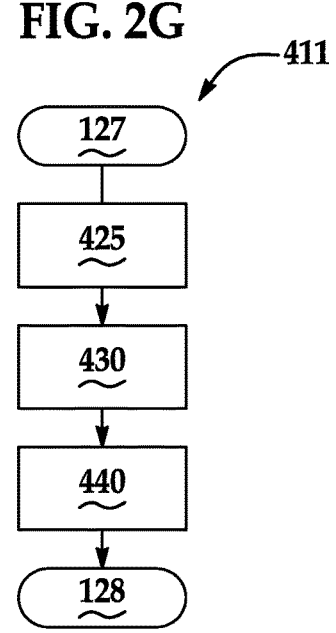

Referring now to FIG. 2H, reference numerals 127 and 128 are flow chart conventions for the start and return, respectively. The sub-process 411, applying the acceleration stress to the device or the modified device, includes, at reference numeral 425, cycling the SMA actuator or the modified SMA actuator in the respective device or the modified device with an acceleration stress applied to the SMA actuator or the modified SMA actuator. In an example, the SMA actuator may include an SMA wire having a first cross-sectional area. In another example, the modified SMA actuator may include a second SMA wire having a second cross-sectional area. Next, step 430 includes determining a number of cycles in a performance life during which the SMA actuator or the modified SMA actuator performs within a predetermined limit immediately followed by a cycle during which the SMA actuator or the modified SMA actuator performs outside of the predetermined limit.

Sub-process 411 continues with step 440, predicting a number of cycles to cause the SMA actuator or the modified SMA actuator in the device or the modified device without the acceleration stress applied to perform outside of the predetermined limit based on the performance life and based on a predetermined relationship between stress and life cycles for the SMA material. The functional life or the test life is the predicted number of cycles.

Figure 9A:
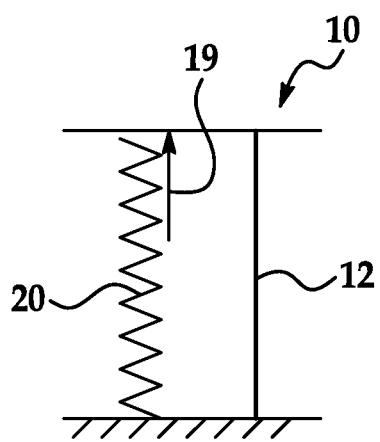
FIG. 9A is semi-schematic diagram depicting an example of a device according to the present disclosure.
Figure 9B:
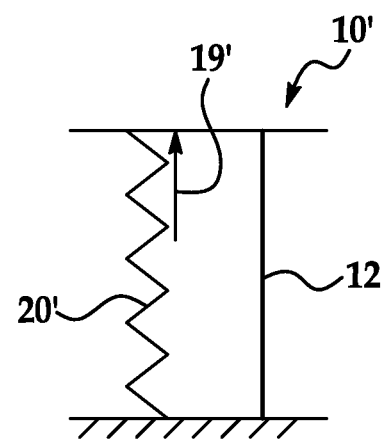
FIG. 9B is a semi-schematic diagram depicting the example of the device shown in FIG. 9A with a modified biasing spring according to the present disclosure.

Referring now to FIGS. 9A and 9B, in an example, the device 10 without the acceleration stress applied may have a biasing spring 20 causing a biasing force 19 antagonistic to an activation of the SMA actuator 12. The device with the acceleration stress applied may have a modified biasing spring 20' causing a greater biasing force 19' compared to the biasing force 19 antagonistic to the activation of the SMA actuator 12. The biasing force difference is a difference between the greater biasing force 19' and the biasing force 19. The acceleration stress is equal to a quotient of the biasing force difference and the cross-sectional area.

Another example is similar to the example immediately above, except a modified device 10' having a modified SMA actuator 12' is used (see, e.g., FIG. 3B). The modified device 10' without the acceleration stress applied may have a biasing spring 20 causing a biasing force antagonistic to an activation of the modified SMA actuator. The modified device with the acceleration stress applied may have a modified biasing spring 20' causing a second greater biasing force compared to the biasing force antagonistic to the activation of the modified SMA actuator. In the example of this paragraph, the biasing force difference is a difference between the second greater biasing force and the biasing force. The acceleration stress is equal to a quotient of the biasing force difference and the cross-sectional area.

An example of an application of sub-process 411 follows: suppose the biasing spring 20 caused a stress of about 300 MPa in the SMA actuator 12. An acceleration stress is applied by using a modified biasing spring 20' with a greater biasing force 19' to raise the stress in the SMA actuator 12 to 400 MPa. The SMA actuator is cycled in the device 10 with the acceleration stress applied to the SMA actuator. In the example, suppose the cycling continues until the SMA actuator 12 operates out of specification at about 7,000 cycles. As such, the performance life is 7,000 cycles. The chart in FIG. 4 depicts a predetermined relationship between stress and life cycles for the SMA material. Using the chart in FIG. 4, the data point shown at 21 corresponds to 7,000 cycles on the 400 MPa iso-stress line. The strain corresponding to point 21 is about 0.026. Point 29 on the 300 MPa iso-stress line corresponds to the strain of 0.026. 100,000 cycles corresponds to point 29. Thus, the predicted number of cycles to cause the SMA actuator 12 in the device 10 without the acceleration stress applied to perform outside of the predetermined limit is 100,000 cycles. As such, the test time was reduced by 93% using the acceleration stress. It is to be understood that other accelerated test processes may be combined with the acceleration stress process for even more accelerated testing. For example, acceleration based on the rate of rise of the maximum temperature of the SMA material in the device, sub-process 311, may be combined with sub-process 411.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Still further, it is to be understood that the ranges provided herein include the stated range and any value or sub-range within the stated range. For example, a range from about 20 cycles to about 100 cycles should be interpreted to include not only the explicitly recited limits of about 20 cycles to about 100 cycles, but also to include individual values, such as 25 cycles, 40 cycles, 55 cycles etc., and sub-ranges, such as from about 30 cycles to about 90 cycles, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

The invention claimed is:

1. A method of testing a shape memory alloy (SMA) actuated device, the method comprising:
   cyclically operating the device;
   determining a number of cycles in a functional life of the device based on observations of the device during the cyclical operation wherein the functional life is a range of consecutive cycles of operation of the device beginning with a first cycle during which the device performs within a specified limit, the functional life immediately followed by a cycle during which the device performs outside of the specified limit; and
   applying a progressive substitution sub-process to identify an opportunity to increase the number of cycles in the functional life of the device, wherein the progressive substitution sub-process includes:
      modifying the device by substituting a modified SMA actuator for the unmodified SMA actuator to operate the modified device wherein:

the modified SMA actuator has a displacement from an unactuated state to a fully actuated state; and
the modified SMA actuator has a reduced length of SMA material relative to an original length of SMA material in the unmodified SMA actuator to cause a strain acceleration factor compared to the unmodified SMA actuator operating in the device;
determining a predicted life by predicting a number of cycles to cause the modified device to perform outside of the specified limit based on the number of cycles in the functional life of the device and based on a predetermined relationship between strain and actuation cycles for the SMA material;
cyclically operating the modified device;
determining a test life wherein the test life is a range of consecutive cycles of operation of the modified device beginning with a first cycle during which the modified device performs within a specified limit immediately followed by a cycle during which the modified device performs outside of the specified limit;
comparing the predicted life to the test life;
if the predicted life is within a predetermined tolerance of the test life, concluding that the opportunity to increase the number of cycles in the functional life of the device is based on reducing a steady-state stress on the SMA actuator in the device;
if the test life is within a second predetermined tolerance of the functional life:
 concluding that a component other than the SMA actuator causes a stroke incompatibility;
 determining a solution for the stroke incompatibility by:
  substituting progressively shorter lengths of the SMA material in a series of SMA actuators for cyclical operation in a series of the modified devices until determining a final length of SMA material in a final SMA actuator that first causes a final device to perform outside of the specified limit on a first cycle; and
  concluding that a stroke is 4.5 percent of the final length; and
 identifying the opportunity to increase the number of cycles in the functional life to a target life by determining a target stress based on the stroke and the original length of the SMA material based on the number of cycles in the target life of the device and based on a predetermined relationship between stress, strain and actuation cycles for the SMA material.

2. The method as defined in claim 1 wherein determining the functional life or the test life includes accelerated testing based on
i) a rate of rise of a maximum temperature of the SMA material in the device or the modified device,
ii) applying an acceleration stress to the device or the modified device, or
iii) a combination of i) and ii).

3. The method as defined in claim 2 wherein applying the acceleration stress to the device or the modified device includes:
cycling the SMA actuator or the modified SMA actuator in the respective device or the modified device with an acceleration stress applied to the SMA actuator or the modified SMA actuator;
determining a number of cycles in a performance life during which the SMA actuator or the modified SMA actuator performs within a predetermined limit immediately followed by a cycle during which the SMA actuator or the modified SMA actuator performs outside of the predetermined limit; and
predicting a number of cycles to cause the SMA actuator or the modified SMA actuator in the device or the modified device without the acceleration stress applied to perform outside of the predetermined limit based on the performance life and based on a predetermined relationship between stress and life cycles for the SMA material wherein the functional life or the test life is the predicted number of cycles.

4. The method as defined in claim 3 wherein:
the SMA actuator includes an SMA wire having a cross-sectional area;
the device without the acceleration stress applied has a biasing spring causing a biasing force antagonistic to an activation of the SMA actuator;
the device with the acceleration stress applied has a modified biasing spring causing a greater biasing force compared to the biasing force antagonistic to the activation of the SMA actuator;
a biasing force difference is equal to a difference between the greater biasing force and the biasing force; and
the acceleration stress is equal to a quotient of the biasing force difference and the cross-sectional area.

5. The method as defined in claim 3 wherein:
the modified SMA actuator includes an SMA wire having a cross-sectional area;
the modified device without the acceleration stress applied has a biasing spring causing a biasing force antagonistic to an activation of the SMA actuator;
the modified device with the acceleration stress applied has a modified biasing spring causing a greater biasing force compared to the biasing force antagonistic to the activation of the SMA actuator;
a biasing force difference is equal to a difference between the greater biasing force and the biasing force; and
the acceleration stress is equal to a quotient of the biasing force difference and the cross-sectional area.

6. The method as defined in claim 2 wherein the accelerated testing based on the rate of rise of the maximum temperature of the SMA material in the device or the modified device includes:
attaching an SMA specimen to the device or the modified device;
cyclically testing the SMA specimen in the device or the modified device to actuate and deactuate the device or the modified device until the maximum temperature of the SMA specimen reaches a test completion temperature;
determining a rate of rise of the maximum temperature of the SMA specimen corresponding to a number of transition cycles; and
predicting an expected number of transition cycles in the test life of the SMA specimen based on the rate of rise of the maximum temperature of the SMA specimen wherein a total number of test cycles is fewer than an actual number of transition cycles in the test life of the SMA specimen operating in the device or the modified device.

7. The method as defined in claim 6 wherein the SMA specimen is an SMA wire.

8. The method as defined in claim 6 wherein determining the rate of rise of the maximum temperature of the SMA specimen corresponding to the number of transition cycles further comprises extrapolating a maximum temperature versus SMA transition cycle count curve.

9. The method as defined in claim 8 wherein predicting the expected number of transition cycles in the test life of the SMA specimen based on the rate of rise of the maximum temperature of the SMA specimen further comprises:
predicting a number of cycles that will correspond to a maximum operational temperature based on the extrapolating of the maximum temperature versus SMA transition cycle count curve; and
predicting an expected number of transition cycles in a the test life of the SMA specimen in the device or the modified device based on the predicted number of cycles that will correspond to the maximum operational temperature.

10. The method as defined in claim 8 wherein:
extrapolating the maximum temperature versus SMA transition cycle count curve includes applying a linear regression technique to a sequence of data points including an ordered pair corresponding to the test completion temperature; and
each data point consists of the maximum temperature and the SMA transition cycle count for a corresponding instance of SMA transition.

11. The method as defined in claim 10 wherein the sequence of data points excludes data points with the SMA transition cycle count ranging from 1 to a predetermined stabilization value.

12. The method as defined in claim 11 wherein the predetermined stabilization value is from about 20 cycles to about 100 cycles.

13. The method as defined in claim 6 wherein cyclically testing the SMA specimen in the device or modified device to actuate and deactuate the device or modified device until the maximum temperature of the SMA specimen reaches the test completion temperature further comprises:
initializing an SMA transition cycle count at zero;
beginning an SMA transition cycle with the SMA specimen in a first microstructure state;
incrementing the SMA transition cycle count by 1;
connecting the SMA specimen to an electrical power source to pass an electrical current through the SMA specimen to heat the SMA specimen via Joule heating to cause the SMA specimen to activate and experience a microstructure transformation to a second microstructure state;
sensing a strain of the SMA specimen during the microstructure transformation;
determining a temperature of the SMA specimen during the microstructure transformation;
recording the temperature of the SMA specimen during the microstructure transformation;
determining the maximum temperature of the SMA specimen for the SMA transition cycle;
recording the maximum temperature of the SMA specimen for the SMA transition cycle with the SMA transition cycle count;
disconnecting the electrical power source from the SMA specimen to allow the SMA specimen to cool and experience a reversal of the microstructure transformation to the first microstructure state; and
repeating the SMA transition cycle from the beginning until the maximum temperature reaches the test completion temperature.

14. The method as defined in claim 13 wherein the strain is sensed by recording a change in position of a portion of the SMA specimen.

15. The method as defined in claim 13 wherein determining the temperature of the SMA specimen further includes calculating the temperature of the SMA specimen using a mathematical model based on an electrical energy from the electrical power source applied to the SMA specimen over time.

16. The method as defined in claim 13 wherein determining the maximum temperature of the SMA specimen for the SMA transition cycle includes determining a temperature corresponding to a location on a strain versus time curve.

17. The method as defined in claim 16 wherein the location on the strain versus time curve corresponds to a maximum rate of strain.

18. The method as defined in claim 13 wherein determining the temperature of the SMA specimen further includes sensing the temperature.

19. The method as defined in claim 18 wherein sensing the temperature is via a thermocouple attached to the SMA specimen.

20. The method as defined in claim 18 wherein sensing the temperature is via an infra-red camera.

* * * * *